United States Patent [19]

Takahasi

[11] Patent Number: 4,797,770
[45] Date of Patent: Jan. 10, 1989

[54] DISK CARTRIDGE WITH RELEASABLE LATCHING SHUTTER

[75] Inventor: Kenji Takahasi, Miyagi, Japan

[73] Assignee: Sony Corporation, Tokyo, Japan

[21] Appl. No.: 6,550

[22] PCT Filed: Apr. 14, 1986

[86] PCT No.: PCT/JP86/00184
§ 371 Date: Feb. 13, 1987
§ 102(e) Date: Feb. 13, 1987

[87] PCT Pub. No.: WO86/06204
PCT Pub. Date: Oct. 23, 1986

[30] Foreign Application Priority Data
Apr. 15, 1985 [JP] Japan .................... 60-55761

[51] Int. Cl.$^4$ ............................. G11B 23/03
[52] U.S. Cl. .................. 369/291; 360/97.01; 360/133
[58] Field of Search ............ 360/133, 97, 99; 206/444; 369/291, 273

[56] References Cited

U.S. PATENT DOCUMENTS 4,546,397 10/1985 Asami et al. ................. 360/133
4,614,990 9/1986 Saito ........................... 360/133

FOREIGN PATENT DOCUMENTS 0020078 1/1984 Japan .

Primary Examiner—Stuart N. Hecker
Assistant Examiner—David J. Severin
Attorney, Agent, or Firm—Lewis H. Eslinger; Jay H. Maioli

[57] ABSTRACT

A pickup aperture provided in a surface of a cartridge body, a sliding shutter provided with a bent portion to be locked by which this aperture is opened and closed, and a locking member provided with a locking recess with which the bent portion to be locked is engaged when the sliding shutter is in a cover-closing position, to thereby lock the shutter. An unlocking pin-inserting bore is provided in the portion of the sliding shutter which is closer to the free end thereof than to the locking recess. When the shutter is in a cover-closing position, an unlocking pin, which is provided on the portion of an apparatus which corresponds to the unlocking pin-inserting bore, is inserted therein, so that the locking member is displaced to cause the bent portion to be locked and the locking recess to be disengaged from each other, the shutter being thus unlocked. The shutter-unlocking operation is carried out with the locking member left fixed. Owing to the unlocking pin, by which this unlocking operation is carried out, the shutter is moved in both the pickup aperture-opening direction and pickup aperture-closing direction.

10 Claims, 11 Drawing Sheets

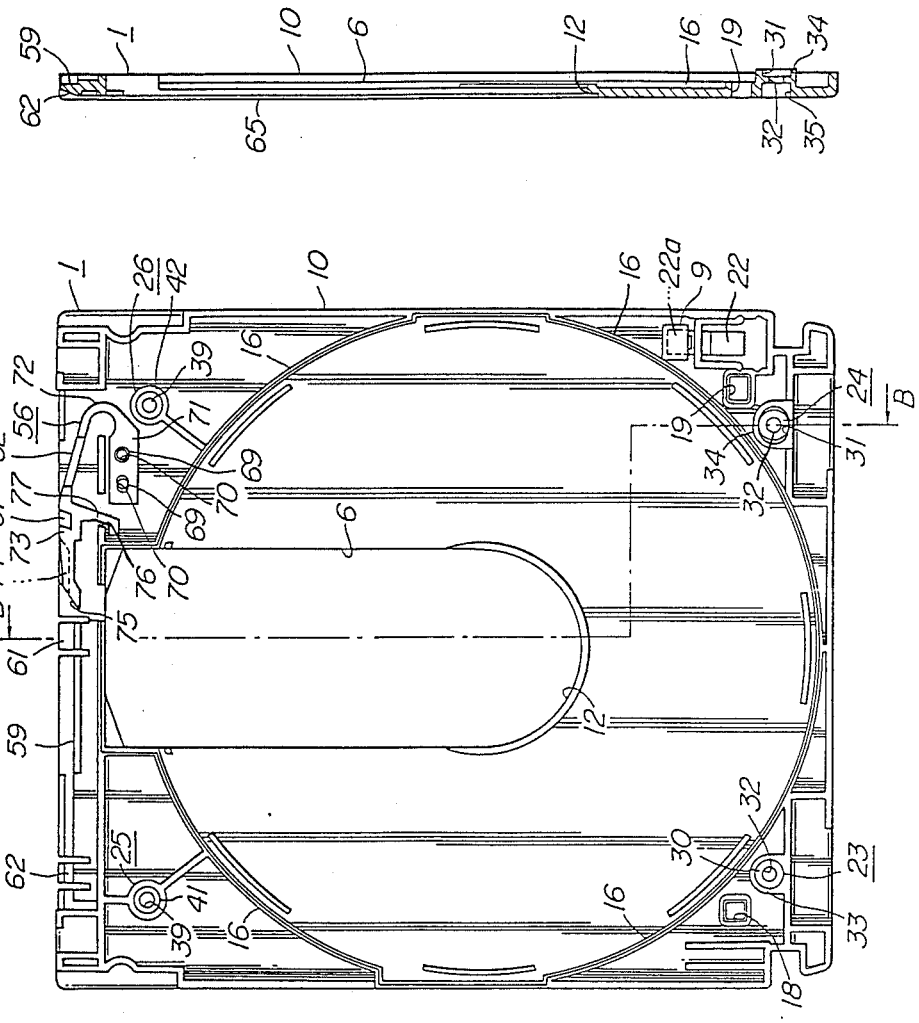

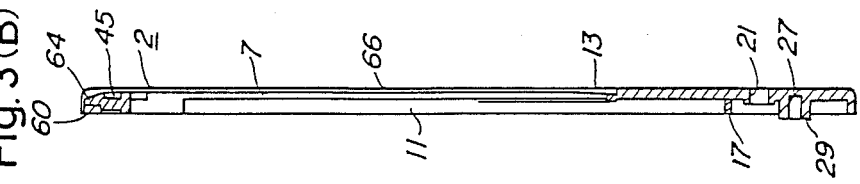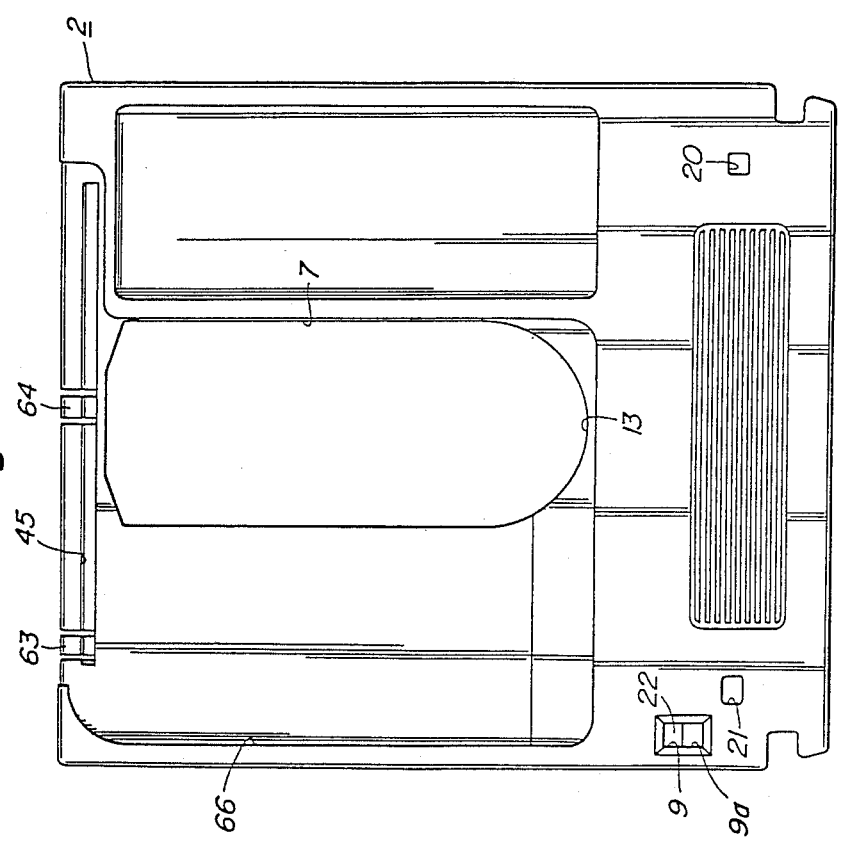

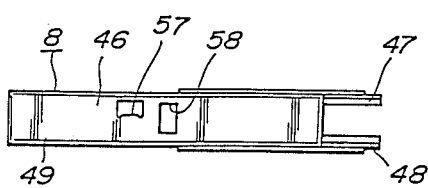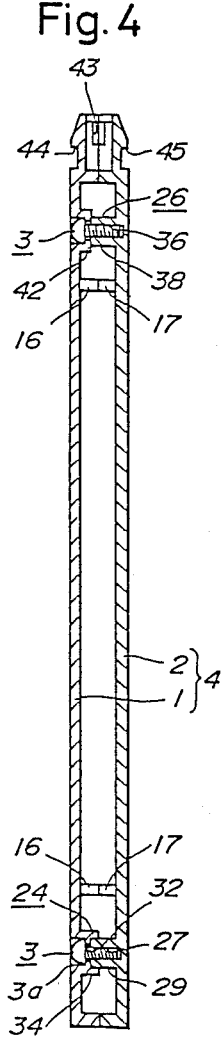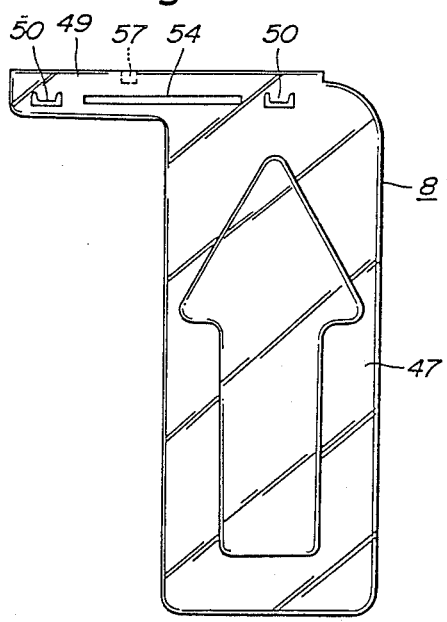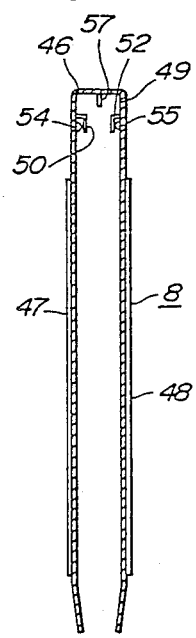

DISK CARTRIDGE WITH RELEASABLE LATCHING SHUTTER

TECHNICAL FIELD

This invention relates to a disk cartridge rotatably accommodating a circular disk such as an opto-magnetic disk, optical disk or a magnetic disk, and provided with a sliding shutter for opening or closing pickup apertures formed in the cartridge body accommodating the disk, wherein the disk cartridge is so designed as to prevent the pickup apertures from being opened as a result of inadvertent opening of the shutter.

BACKGROUND ART

The disk cartridge of the prior art is comprised of a cartridge body made up of an upper half and a lower half abutted and connected to each other, and a circular disk rotatably accommodated within the cartridge body. Approximately at the center of the upper and lower sides of the disk-accommodating cartridge body, there are formed table insertion apertures confronted by a disk table of a disk driving device adapted for driving the disk into rotation and the pickup apertures confronted by a pickup writing or reading information signals to or from the disk, said pickup apertures being contiguous to said table insertion apertures and extending along the disk radius. A channel-shaped sliding shutter for opening or closing the table insertion apertures and the pickup apertures is adapted to be press-fitted from the front side of the cartridge body.

The sliding shutter is so designed that, when it is in the cover-closed position covering the pickup apertures, the bent portion provided to the shutter as the locked member is locked by engagement with a locking recess in a locking member provided to the cartridge body in such a manner as to prevent dust deposition on or injury to the disk accommodated in the cartridge body otherwise caused by inadvertent opening of the pickup apertures.

It may be contemplated to effect a cover-opening operation of the sliding shutter by a sliding operation after the bent portion to be locked is disengaged from the locking recess by resilient deflection of the locking member caused by an unlocking pin provided to the recording and/or reproducing device operatively connected to the disk cartridge.

In the disk cartridge wherein unlocking is performed in the aforementioned manner, the amount of deflection of the locking member is changed with the position acted upon by the unlocking pin of the locking member. As a result, the thrust force applied to the resilient deflecting portion of the locking member which is designed with a predetermined resilient deflection is drastically changed so that a load in excess of the limit of mechanical strength may be applied to the resilient deflecting part thus occasionally causing destruction of the locking member. Even though the resilient deflecting part is not destructed in this manner, the locking function proper to the locking member is lost as a result of application of a load in excess of the threshold strength value. As a result, the pickup apertures are opened through inadvertent opening of the shutter resulting in destruction of the disk contained in the cartridge body through intrusion of dust and dirt or other impurities.

It is therefore an object of the present invention to provide a disk cartridge wherein an unnecessary load is not applied to the shutter locking member except during the opening or closing operation for thereby assuring sufficient resilient deflection for a prolonged time, and wherein inadvertent cover-opening operation of the shutter is prevented to assure positive disk protection by providing a positive shutter locking.

It is another object of the present invention to provide a disk cartridge in which a passage for a bent portion of the shutter is provided in the shutter locking member is an engaging recess of which said bent portion to be locked is engaged to lock the shutter.

DISCLOSURE OF THE INVENTION

The present invention resides in a disk cartridge comprising pickup apertures provided in the plane of the cartridge body, a sliding shutter having a bent portion to be locked, said bent portion opening or closing said pickup apertures, and a locking member having a locking recess in which said bent portion to be locked is engaged when said sliding shutter is in the cover-closing position for locking said shutter, there being formed in said sliding shutter an unlocking pin insertion aperture which is disposed closer to the free end side than the locking recess of said locking member when said sliding shutter is in the cover-closing position, whereby, when the unlocking pin provided from the recording and/or reproducing apparatus is inserted into the insertion aperture, the locking member is deflected to disengage the bent portion from the locking recess for unlocking the shutter. Thus the shutter unlocking operation may be attained with the locking member remaining fixed, while a movement in either directions of closing or opening the shutter is made possible by the unlocking pin designed to unlock the shutter. Since no load is applied to the locking member except during the time of opening or closing the shutter, the locking member is not deformed while the force of resilient deflection is maintained for a prolonged time for assuring positive shutter locking.

In addition, in accordance with the present invention, a passage for the bent portion of the shutter is formed in the locking member in a locking recess of which the bent portion of the shutter is engaged to lock the shutter such that the locking and unlocking between the bent portion and the locking recess may be attained by only a small deflection of the locking member for assuring a smooth and reliable slide operation during the shutter locking and unlocking and during the sliding operation at the time of opening and closing the shutter, while the length of the bent portion and the depth of the locking recess may be selected to be sufficiently larger than the deflection of the locking member so as to assure more reliable shutter locking.

BRIEF DESCRIPTION OF THE DRAWINGS

FIG. 2(A) is a plan view showing the inner side of the upper half of the cartridge body;

FIG. 2(B) is a sectional view taken along line B—B of FIG. 2(A); and

FIG. 3(B) is a sectional view taken along line B—B of FIG. 3(A); and

FIG. 3(C) is a plan view showing the outer side of the lower half.

FIG. 4 is a longitudinal sectional view of the cartridge body.

FIG. 5(A) is a plan view of the shutter;

FIG. 5(B) is a front view of the shutter; and

FIG. 5(C) is a sectional view of the shutter.

BEST MODE FOR EXECUTING THE INVENTION

A disk cartridge according to the present invention will be hereafter explained by referring to the accompanying drawings.

Figure 1:
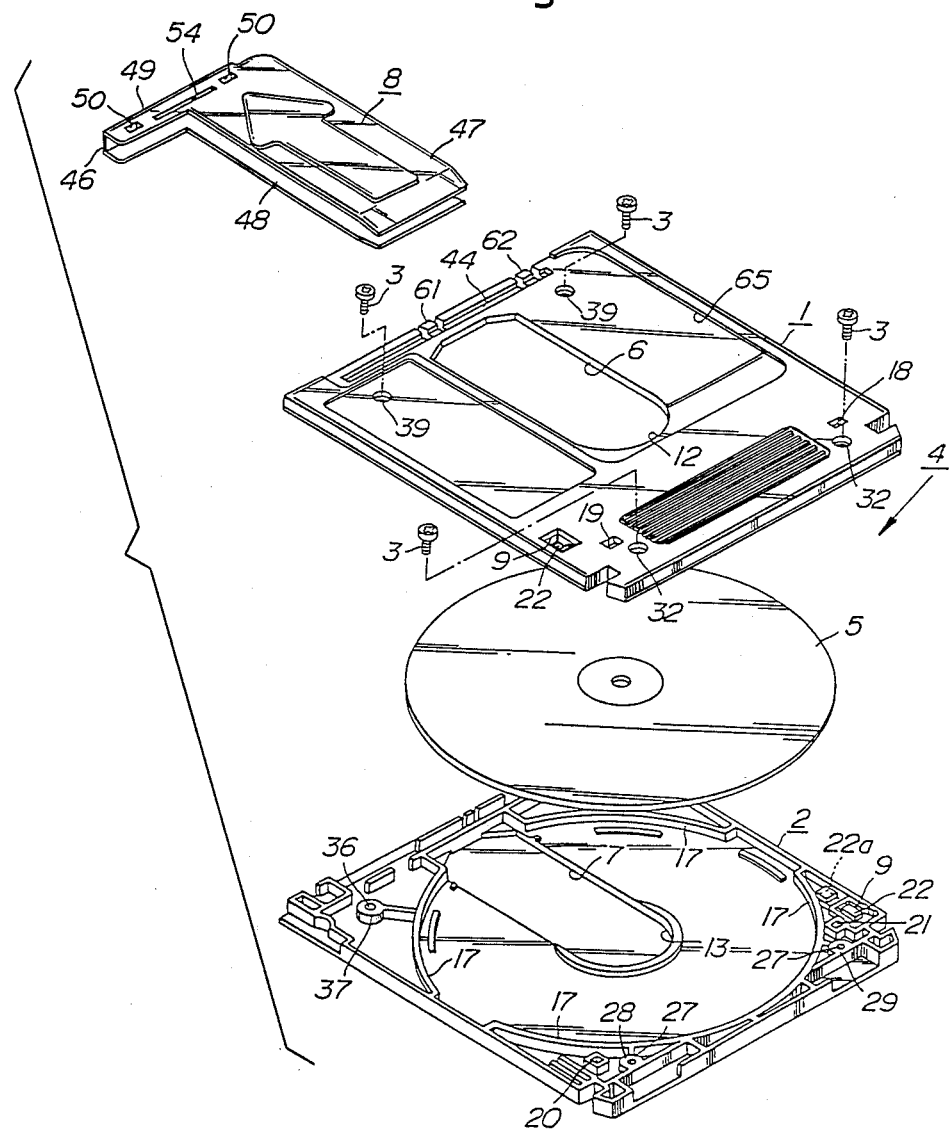
FIG. 1 is an exploded perspective view of a disk cartridge according to the present invention.

As shown in FIG. 1, the disk cartridge according to the present invention is mainly comprised of a cartridge body 4 made up of an upper half 1 and a lower half 2 in the shape of substantially flat square plates that are formed by molding from e.g. synthetic resin and are fixedly connected to each other by plural set screws 3, a circular disk, such as an opto-magnetic disk 5, rotatably accommodated within the main body 4, and a sliding shutter 8 adapted for opening or closing apertures 6, 7 formed in the upper half 1 and the lower half 2 of the cartridge body 4 and confronted by an optical pickup adapted for writing and reading information signals to and from the disk 5.

The upper half 1 and the lower half 2 constituting the cartridge body 4 are designed in symmetry with each other except that mounting portions 9 for writing-safety members adapted for inhibiting writing to the disk 5 are at the same position such that the writing-safety members are mounted at opposite positions to each other when the upper half 1 and the lower half 2 of the cartridge body 4 are abutted and connected to each other. Moreover, the upper half 1 and the lower half 2 are so designed as to define a space therebetween for rotatably accommodating the disk 5 when the upper and lower halves are abutted and connected to each other. The upper half 1 and the lower half 2 are formed with upright peripheral wall sections 10, 11 for defining a peripheral wall of the cartridge body 4 when the wall sections are abutted and connected to each other, as shown in FIGS. 2A, 2B, 3A and 3B. The upper half 1 and the lower half 2 are formed with central disk table insertion apertures 12, 13 confronted by a disk table of a disk rotating device provided to the recording and reproducing apparatus for rotating the disk accommodated in the cartridge body 4. Contiguous to these disk table insertion apertures 12, 13 and radially of the disk 5, there are also formed, pickup apertures 6, 7 confronted by the optical pickup and being of the same radius as the diameter of the disk table insertion apertures 12, 13. These apertures 6, 7 are bored substantially in the form of rectangles extending from the center of the upper half 1 and the lower half 2 towards their front sides operatively connected to the shutter 8. On the inner surfaces of the upper half 1 and the lower half 2 and on a circumference of a circle that is centered about the disk insertion apertures 12, 13 and that is slightly larger than the outside diameter of the disk 5, there are projectedly formed a plurality of arcuate ribs 16, 17, that are designed to form a disk accommodating part and a position regulating wall regulating the horizontal position of the disk 5 when the ribs are abutted to each other. These arcuate ribs 16, 17 are formed at the respective corners of the upper half 1 and the lower half 2 and are of the same height as the upright wall sections 10, 11.

In an area defined by the upright wall sections 10, 11 at the corners of the rear sides of the upper and lower halves 1 and 2 opposite to the front sides thereof operatively associated with the shutter 8, and by associated arcuate ribs 16, 17, there are formed each two mounting positioning reference apertures 18, 19; 20, 21 into which positioning pins provided to the recording and/or reproducing apparatus are fitted when the disk cartridge is mounted to the recording and/or reproducing apparatus so that these reference apertures are used for mounting positioning. The recording and/or reproducing apparatus is also provided with a pair of height positioning pins in opposition to these positioning pins for supporting the disk cartridge surface for setting the height position.

At the corners of the upper half 1 and the lower half 2 where there are provided the other reference apertures 19, 21, there are provided writing safety member mounting sections 9, 9 laterally of these reference apertures 19, 21. In these writing-safety member mounting sections 9, 9, there are slidably mounted writing-safety members 22 provided with end writing safety portions 22a. When slid, the writing-safety member 22 causes the position of the writing-safety portions 22a confronting to through-holes 9a, 9a of the mounting sections 9, 9 to be changed for realizing a writing inhibit state or a writing enable state as desired.

On the other hand, in an area surrounded by the arcuate ribs 16, 17 and the upright wall sections 10, 11 at the corners on the front side operatively associated with the shutter 8 and on the rear side and in the vicinity of the reference apertures 18, 19; 20, 21 provided to the upper half 1 and the lower half 2, there are formed pairs of screw receiving portions 23, 24; 25, 26 in which are threaded the set screws 3 for connecting and securing the upper half 1 and the lower half 2 to each other.

The paired screw receiving portions 23, 24 provided in the vicinity of the reference apertures 18, 19; 20, 21 are formed by cylindrical boss-like formations 28, 29 projectedly provided to the inner surface of the lower half 2 and having bottomed screw holes 27 and receiving blocks 33, 34 for said formations having end recesses 30, 31 in turn having threaded through-holes and projectedly provided to the inner surface of the upper half 1 so as to be engaged by the ends of the boss-like formations 28, 29. The receiving recess 30 provided at the end of the receiving block 33 constituting the screw receiving portion 23 has a circular contour with a diameter about equal to the end diameter of the formation 28 fitted therein so that the formation 28 has a light press fit therein for positioning fitting.

The screw receiving portions 25, 26 provided to the front sides of the upper and lower halves 1 and 2 are formed by cylindrical boss-like formations 37, 38 projectedly formed on the inner surface of the lower half 2 and having bottomed screw threads 36, and by cylindrical boss-like formations 41, 42 projectedly formed on the inner surface of the upper half 1 and having threaded through-holes 39, wherein the boss-like formations 37, 38 and 41, 42 abut to one another.

The upper and lower halves 1 and 2 provided with the screw receiving portions 23, 24; 25, 26 as described above are abutted and temporarily secured while also being positioned to one another with the disk 5 accommodated therein and with the boss-like formations 28, 29 of the screw receiving portions 23, 24 on the sides of the reference apertures 18, 19; 20, 21 being press-fitted in the receiving recesses 30, 31 of the receiving blocks 33, 34. By threading the set screws 3 into these screw receiving portions 23, 24 and the screw receiving portions 25, 26 at the front sides, there is securely completed the cartridge body 4 in which the disk 5 is rotatably accommodated, as shown in FIG. 4.

In addition, on the outer surfaces along the front sides and edges of the upper and lower halves 1 and 2 where there are formed the apertures 6 and 7, there are formed guide grooves 44, 45 adapted for sliding and guiding the shutter 8 adapted for opening and closing the apertures 6 and 7.

The shutter 8 which is provided in opposition to the upper and lower surface of the main body 4 and slidably mounted by the intermediary of the guide grooves 44, 45, is formed by bending a metal plate, such as a stainless steel plate, in the form of a channel, as shown at A, B and C in FIG. 5. Thus the shutter 8 is made up of an upper shutter portion 47 and a lower shutter portion 48 bent from both sides of a common junction portion 46 and being of a sufficient extent to cover the aforementioned apertures 6 and 7 and the disk insertion apertures 12 and 13 simultaneously, with a sliding guide 49 being constituted by junction portions of the upper and lower shutter portions 47 and 48 to the junction portion 46 and by the junction portion 46. The sliding guide 49 is extended further in the direction of the guide grooves 44, 45 from one sides of the upper shutter portion 47 and the lower shutter portion 48. Thus the shutter 8 has a contour substantially in the shape of a letter L when seen in plan, as shown at A in FIG. 5.

At the both ends of the sliding guide 49 of the shutter 8, there are formed paired guide pieces 50, 52 on the upper and lower sides thereof and in opposition to each other, these guide pieces being formed by cutting and inwardly bending portions of the slide guide 49 and being guided in engagement with the aforementioned guide grooves 44, 45. As shown at C in FIG. 5, these guide pieces 50, 52 are bent in the form of a letter L when seen in cross-section, and are of a width approximately equal to the width of each of the guide grooves 44, 45, with the forward parts thereof bent outwards. The guide pieces 50, 52 formed in this manner are engaged in the guide grooves 44, 45 for preventing the shutter from being extricated from the cartridge body 4.

Between the paired guide pieces 50 and 52, there are formed ribs 54, 55 by drawing in order to prevent the sliding guide from being bent or flexed in the longitudinal direction or in the direction of thickness as a result of the sliding guide 49 being elongated relative to the width of the upper and the lower shutter portions 47, 48.

The junction piece 46 of the shutter 8 is formed with a bent portion 57 by partial cutting and erecting, said bent portion being engaged by a locking member 56 for the shutter 8 provided to the cartridge body 4 when the shutter 8 is in the closure position. The junction portion 46 also has an insertion aperture 58 in which is inserted an unlocking pin 68 provided from the recording and/or reproducing apparatus as later described. The foremost side corner of the bent portion 57 is arcuate to permit smooth sliding. The unlocking pin insertion aperture 58 is positioned at the free end side of the locking member 56 and in proximity to the bent portion 57.

Figure 6:
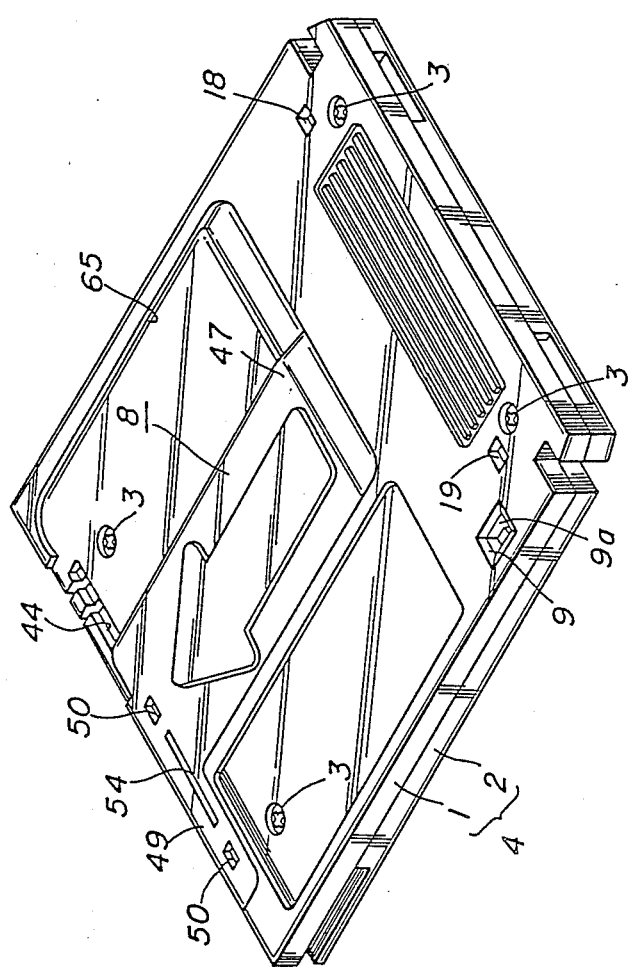
FIG. 6 is a perspective view of the disk cartridge of the present invention when the shutter is in the cover-closed position.

On the forward side faces of the upper half 1 and the lower half 2 along which slides the sliding guide 49 of the shutter 8 are formed slide recesses 59, 60 defining a slide groove 43 along which slide the bent portion 57 to be locked and the unlocking pin 68. The upper half 1 and the lower half 2 are formed with resilient deflection tabs 61, 62; 63, 64 defined by forming slots opening on the front side face from the guide grooves 44, 45 so as to be in register with the guide pieces 50, 52 of the shutter 8. The outer face sides of these deflection pieces 61, 62; 63, 64 are tapered to provide for facilitated insertion of the guide pieces 50, 52 into the guide grooves 44, 45. As the shutter 8 is fitted to the forward side face of the main body 4 with the guide pieces 50, 52 in register with the resilient deflection pieces 61 62; 63, 64, these deflection pieces are flexed by the guide pieces 50, 50; 52, 52. Thus the shutter 8 is slidably mounted as shown in FIG. 6 with the guide pieces 50, 52 easily engaging in the guide grooves 44, 45 for opening or closing the apertures 6, 7.

Figure 2C:
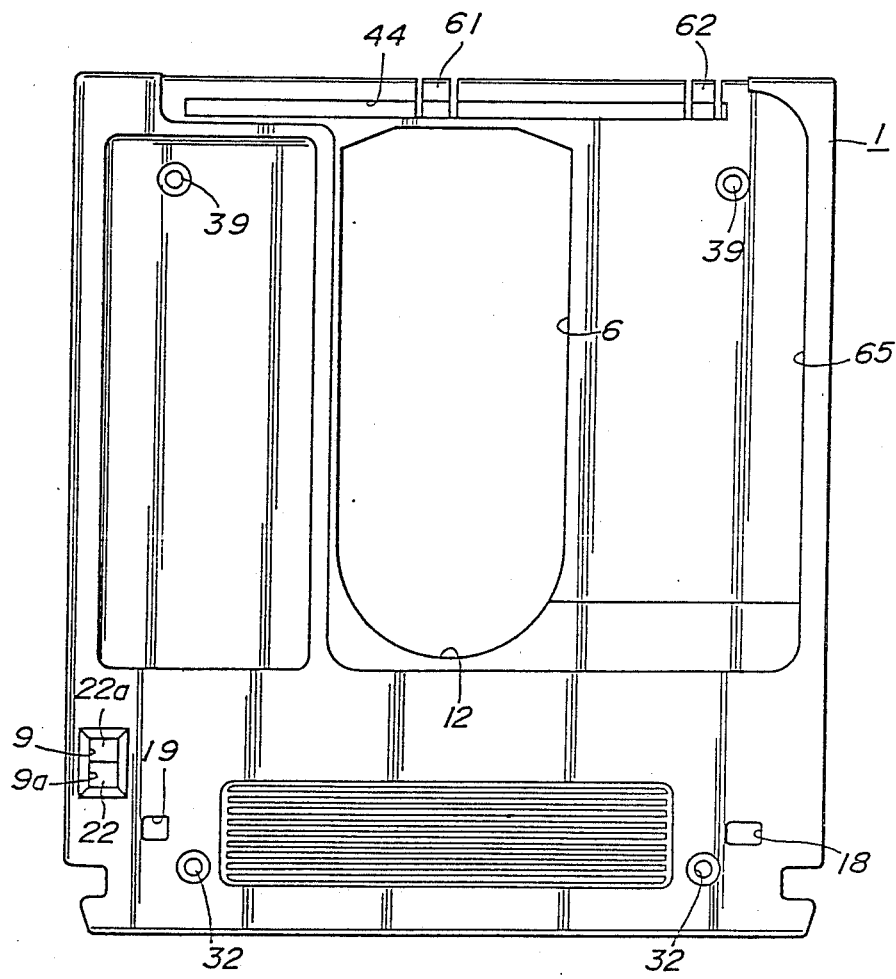
FIG. 2(C) is a plan view showing the outer surface of the upper half.
Figure 3A:
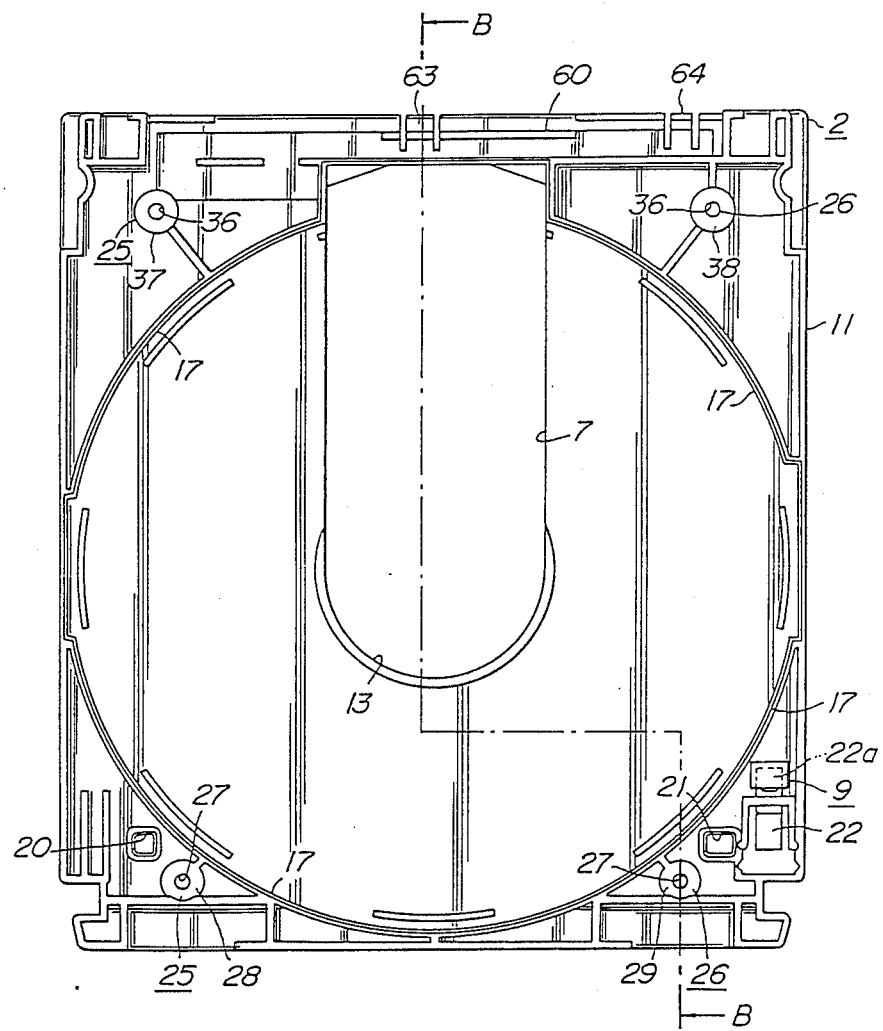
FIG. 3(A) is a plan view showing the inner side of the lower half of the cartridge body.

From the front to the outer side faces of the upper half 1 and the lower half 2, there are formed recesses 65, 66 delimiting the extent of the sliding of the shutter 8, as shown at B, C in FIG. 2 and B, C in FIG. 3.

Figure 7:
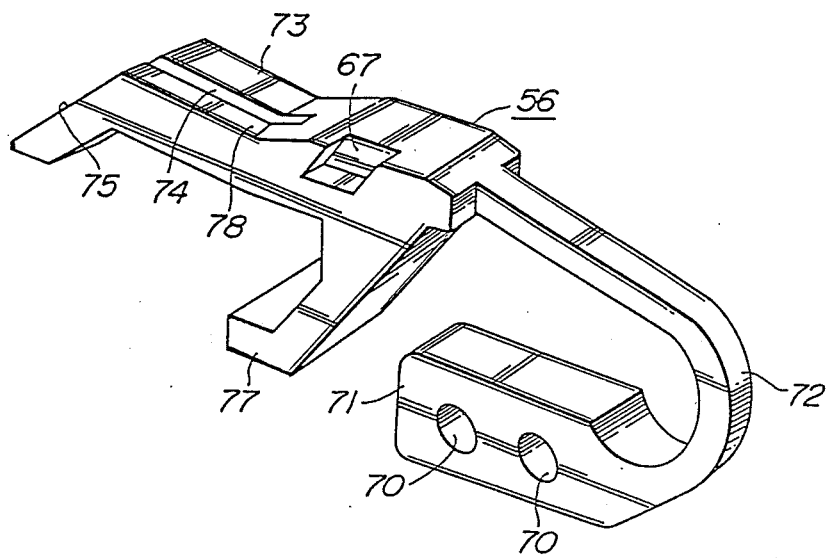
FIG. 7 is a perspective view of the locking member.
Figure 8:
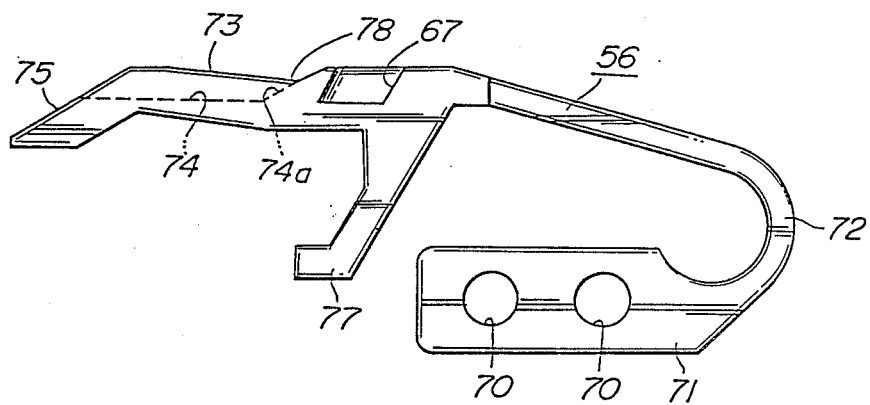
FIG. 8 is a side view of the locking member.
Figure 9:
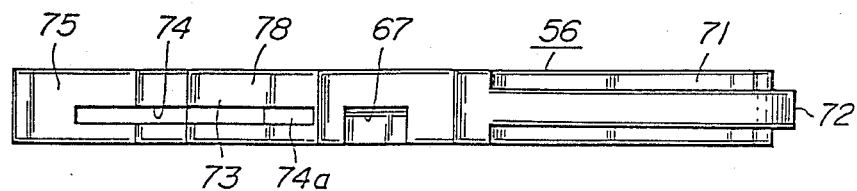
FIG. 9 is a plan view of the locking member.

To a corner on the front inner sides of the upper half 1 is attached the locking member 56 molded from synthetic material and having a locking recess 67 into which the bent portion 57 is engaged for locking the shutter 8 when the shutter 8 is in a position of closing the apertures 6, 7 of the cartridge body 4. As shown in FIG. 7, this locking member 56 is molded from synthetic resin and formed as an extension through a thrusted portion 73 and a semicircular resilient deflecting portion 72 from one end of a mounting base portion 71 having through-holes 70, 70 adapted to be engaged by a pair of attachment pins 69, 69 implanted on the inner surface of the upper half 1, said thrusted portion being thrusted by the unlocking pin described above. The locking recess 67 to be engaged by the bent portion 57 of the shutter 8 is formed halfway on one side of the thrusted portion 73. On the surface of the thrusted portion 73 abutted by the unlocking pin, and at a position closer to the free end of the locking member than the locking recess 67, there is formed an adjustment recess 78 for adjusting the thrust given by the locking member, as shown in FIGS. 8 and 9, said recess being an inclined surface gradually inclined with down ward gradient towards the deflecting portion 72. On said surface is also formed a slit-like passage 74 into which the bent portion 57 is intrudingly passed upon sliding operation of the shutter 8. This passage 74 is formed as a slot having a depth and a width so selected that the bent portion 57 does not touch the groove sides during sliding of the shutter 8. The passage 74 is also formed with a width lesser than the diameter of the unlocking pin 68 provided to the recording and/or reproducing apparatus for thrusting the locking member 56 so that the unlocking pin 68 when thrusting the locking member 56 is not intruded into the passage 74.

It will be noted that, by shifting the trajectory of the unlocking pin 68 away from the passage 74, the passage 74 can be formed with a width larger than the unlocking pin 68.

An inclined portion 75 is formed on one side of the free end of the locking member 56, in such a fashion that, when the locking member is acted upon by the unlocking pin 68 provided by the recording and reproducing apparatus, the locking member is gradually resiliently deflected so as to be then returned gradually resiliently to its former position. Although the inclined portion 75 is formed as a straight inclined surface in the present embodiment, it may also be curved arcuately.

There is projectedly provided halfway on the opposite side of the thrusted portion 73 a substantially L-shaped engaging portion 77 that is engaged with an engaging portion 76 formed by partially removing the upright wall section 10 on the front lateral side of the upper half 1 for regulating any excess resilient deflection towards the free end and also for regulating resilient deflection of the thrusted portion 73 towards the outside of the cartridge body 4 for thereby protecting the locking member 56.

The locking member 56 formed as described above is mounted as shown at A in FIG. 2 with the deflecting portion 72 disposed within the slide recess 59 and with the mounting base portion 71 being engaged by mounting pins 69, 69 through engaging apertures 70, 70.

Figure 11:
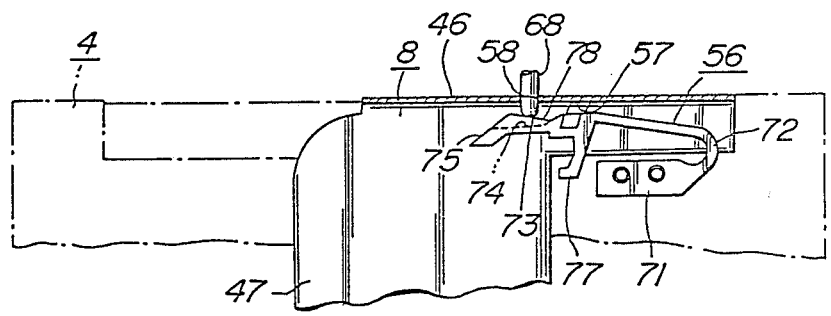
FIG. 11 is a plan view showing essential parts of the shutter with the shutter being unlocked and prior to being slid to the cover-opening position.
Figure 12:
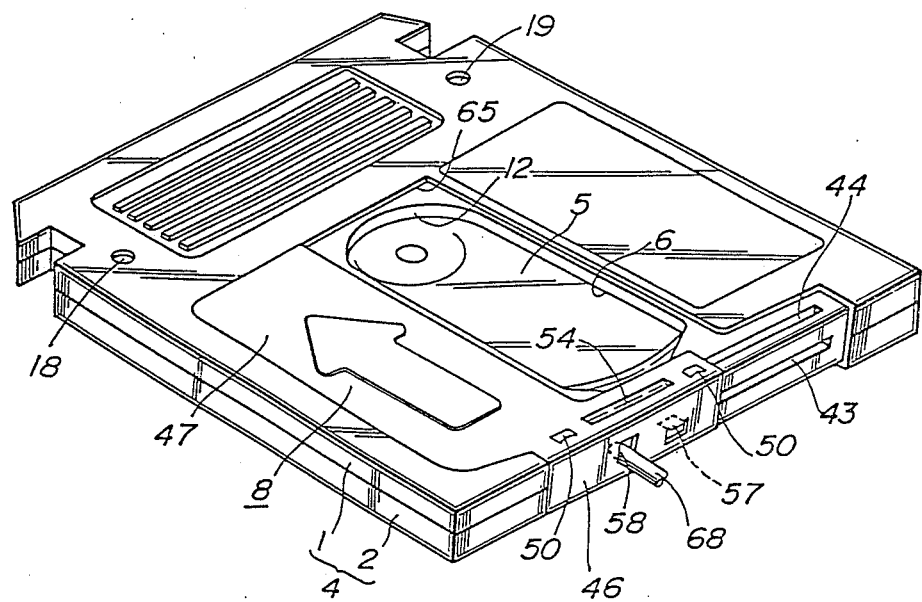
FIG. 12 is a perspective view showing the cover-opening operation of the shutter.

The locking and unlocking operations for the locking member 56 by the shutter 8 in the above described disk cartridge is hereafter explained. When the disk cartridge is mounted to the recording and/or reproducing apparatus, the unlocking pin 68 provided to the apparatus is intruded into the cartridge body 4 through the unlocking pin insertion aperture 58 for thrusting the portion 73 of the locking member 56 as shown in FIG. 11 into resilient deflection. When the portion 73 is thrusted in this manner, the bent portion 57 of the shutter 8 is disengaged from the locking recess 67. Then, with the unlocking pin 68 remaining engaged in the unlocking pin insertion aperture 58, the shutter 8 is slid in the cover-opening direction. As the shutter 8 approaches the inclined portion 75 of the thrusted portion 73, the bent portion 57 confronts to the passage 74. When the unlocking pin 68 comes to a position slightly above the inclined portion 75, the locking member 56 is resiliently returned to its former position. The bent portion 57 is intruded into the passage 74 and the shutter 8 is slid in this state for opening the pickup apertures 6, 7, as shown in FIGS. 12.

The cover-closing operation of the shutter 8 that has opened the apertures 6, 7 for opening the cover is performed by the reverse of the procedure described in the foregoing. First of all, when the shutter 8 is slid towards the locking member 56, the bent portion 57 intrudes into the passage 74, the unlocking pin 68 then riding on the inclined portion 75 for gradually flexing the locking member 56. As the shutter 8 is moved until the unlocking pin 68 arrives at a position overlying the thrusted portion 73 to cause the locking member 56 to be significantly flexed as shown in FIG. 11, the bent portion 57 is shifted to a position in register with the locking recess 67. When the unlocking pin 68 is extracted from the insertion aperture 58, the locking member 56 is resiliently returned, with the bent portion 57 engaging in the locking recess 67 to lock the shutter 8.

Figure 10:
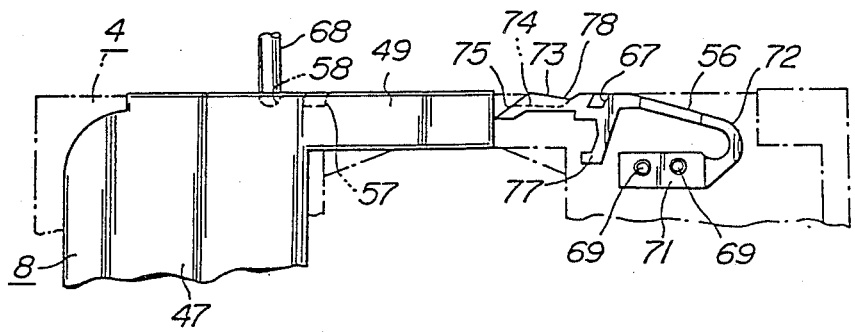
FIG. 10 is a plan view showing essential parts of the shutter when in the unlocked position.

It should be noted that, with the locking member 56 having its free end side formed as the thrusted portion 73, as described above, the amount of deflection differs as a function of the thrusting position so long as the amount of intrusion of the unlocking pin 68 into the cartridge member 4 remains constant. When the relative thrust position on the portion 73 by the unlocking pin 68 is changed and the portion 73 is thrusted at the resilient deflection portion 72, as indicated by the dotted line in FIG. 10, it is deflected more pronouncedly than when it is thrusted at the free end side. In the disk cartridge of the present invention, however, since the adjustment recess 78 inclined from the free end side towards the resilient reflecting side 72 is provided so that, when the unlocking pin 68 thrusts the portion 73 at a point closer to the deflecting portion 72 than the predetermined normal position, the amount of the thrusting applied to the thrusted portion 73 is adjusted by virtue of the provision of the recess 78 so that the deflecting portion 72 may be prevented from being deflected in more than a predetermined amount. That is, the further the thrusting position of the unlocking pin 68 is shifted away from the normal thrusting position towards the resilient deflecting portion 72, the deeper becomes the adjustment recess 78, in order to absorb the difference in deflection of the thrusted portion 73 caused by the deviation in the thrusting position by the unlocking pin 68.

Figure 13:
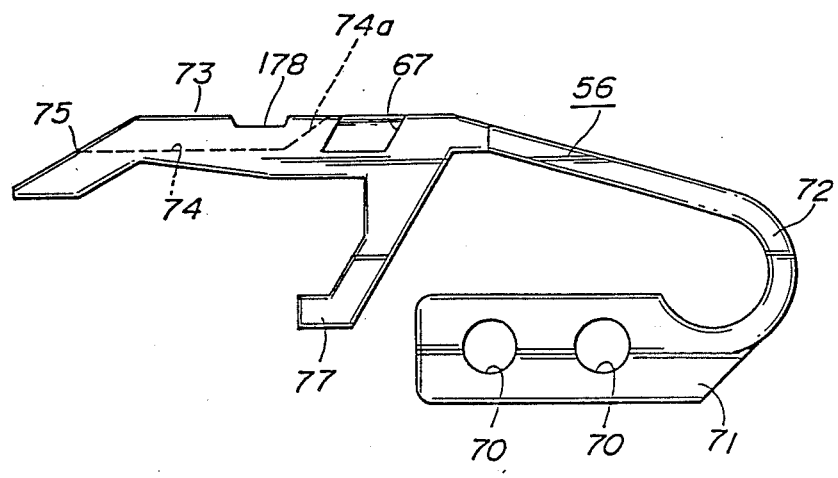
FIG. 13 is a side view showing a modification of the locking member constituting the present invention.

It will be noted that, since the adjustment recess 78 is designed to absorb any excess deflection of the locking member 56 for thereby protecting the resilient deflecting portion 72, the adjustment recess may be formed, as shown in FIG. 13 as a recess 178 having a constant depth for an area substantially in register with the position at which a load in excess of the limit strength value may be applied to the resilient deflecting portion 72.

It is to be noted that the adjustment recess 178 is designed with a depth to cause a deflection of the locking member 56 to induce a deflection sufficient to disengage the bent portion 57 of the shutter 8 from the locking recess 57 when the unlocking pin 68 thrusts the adjustment recess.

Industrial Utilizability

According to the present invention, when the sliding shutter is in the cover-opening position, the insertion opening for the shutter unlocking pin is located closer to the free end side than the locking portion of the locking member and, as the unlocking pin provided to the recording and/or reproducing apparatus is introduced through the insertion opening for the unlocking pin, the locking member is deflected to effect unlocking. As the unlocking pin is moved, the shutter is separated from the locking member and moved along with the unlocking pin in both directions for opening and closing the pickup apertures.

Hence, no load is applied to the locking member except during the shutter opening and closing time so that sufficient resiliency may be maintained for a prolonged time without deforming the locking member for assuring positive shutter locking. Any inadvertent opening of the pickup apertures may be avoided to assure a positive disk protection.

In addition, the unlocking pin abuts on a portion closer to the free end side than the shutter locking recess, the resilient deflection of the locking member is facilitated to provide for smooth engagement of the bent portion of the shutter in the locking recess while allowing to reduce the unlocking force provided by the unlocking pin.

Therefore, the present invention may be advantageously applied to a disk cartridge rotatably accommodating a circular disk such as an opto-magnetic disk, an optical disk or a magnetic disk, wherein there are provided a sliding shutter for opening and closing pickup apertures in the cartridge body accommodating the disk and a mechanism for locking the shutter.

I claim:

1. A disk cartridge comprising pickup apertures provided in the plane of the cartridge body, a sliding shutter having a bent portion, said sliding shutter having portions for opening or closing said pickup apertures, and a resilient locking member having a locking recess in which said bent portion is engaged when said sliding shutter is in a shutter-closed position so as to lock said shutter, said locking member also having a base portion mounted to said cartridge body and a free end, there being formed in said sliding shutter an unlocking pin insertion aperture adapted to receive an unlocking pin from a recording and/or reproducing apparatus to deflect said free end of said locking member and for sliding the shutter to a shutter-open position, said aperture being disposed aligned with the free end of said locking member when said sliding shutter is in the shutter-closed position.

2. A disk cartridge assembly according to claim 1 wherein the locking member is free of engagement with, and undeflected by, the unlocking pin when the shutter is in the open position.

3. A disk cartridge assembly according to claim 1 wherein an adjustment recess is provided on said locking member between the free end and the locking recess, said adjustment recess being an inclined surface with a downward gradient away from the free end.

4. A disk cartridge according to claim 1 wherein the sliding shutter comprises an upper shutter portion for covering and uncovering a pickup aperture on one face of the cartridge body, and a lower shutter portion for covering and uncovering a pickup aperture on another face of the cartridge body, and wherein the bent portion is formed in a common junction portion of the sliding shutter.

5. A disk cartridge assembly according to claim 4 wherein the sliding shutter has an L-shape with the junction portions extending beyond the upper and lower shutter portions.

6. A disk cartridge assembly according to claim 1, including means for limiting the movement of the free end of the locking member.

7. A disk cartridge assembly according to claim 6 wherein the locking member has an engaging L-shaped portion depending from the side of the locking member opposite the locking recess to form a U-shaped recess in which is received a wall section of the cartridge body, to limit movement of the free end of the locking member.

8. A disk cartridge according to claim 1 wherein a passage for said bent portion is formed in said locking member for allowing clearance between the bent portion and the locking member as the shutter is slid between closed and open positions.

9. A disk cartridge according to claim 8 wherein said passage is formed as a groove in the surface of said locking member.

10. A disk cartridge according to claim 9 wherein the groove has a width larger than the diameter of the unlocking pin.

* * * * *